United States Patent
Gomes et al.

(10) Patent No.: US 12,423,658 B2
(45) Date of Patent: Sep. 23, 2025

(54) MULTI-DIMENSIONAL CANDIDATE CLASSIFIER

(71) Applicant: ADP, INC., Roseland, NJ (US)

(72) Inventors: Rafael Gomes, Porto Alegre (BR);
Eduardo Hoefel, Porto Alegre (BR);
Andre Mendes, Porto Alegre (BR);
Bruna Gouveia, Porto Alegre (BR);
Leandro Eidelwein, Porto Alegre (BR);
Roberto Dias, Sao Paulo (BR)

(73) Assignee: ADP, Inc., Roseland, NJ (US)

( * ) Notice: Subject to any disclaimer, the term of this patent is extended or adjusted under 35 U.S.C. 154(b) by 1303 days.

(21) Appl. No.: 16/380,411

(22) Filed: Apr. 10, 2019

(65) Prior Publication Data

US 2020/0327505 A1     Oct. 15, 2020

(51) Int. Cl.
*G06Q 10/1053*     (2023.01)
*G06N 20/00*     (2019.01)

(52) U.S. Cl.
CPC ......... *G06Q 10/1053* (2013.01); *G06N 20/00* (2019.01)

(58) Field of Classification Search
CPC ..... G06Q 10/1053; G06N 20/00; G06N 20/20
USPC ........................................................ 705/321
See application file for complete search history.

(56) References Cited

U.S. PATENT DOCUMENTS

| | | | |
|---|---|---|---|
| 6,675,164 B2 * | 1/2004 | Kamath | G06K 9/6282 |
| 7,555,441 B2 * | 6/2009 | Crow | G06Q 10/0631 |
| | | | 705/7.14 |
| 10,528,916 B1 * | 1/2020 | Taylor | G06N 7/005 |
| 10,803,421 B1 * | 10/2020 | Garg | G06Q 10/1053 |
| 2011/0208665 A1 * | 8/2011 | Hirsch | G06Q 10/1053 |
| | | | 705/321 |
| 2015/0046356 A1 * | 2/2015 | Millmore | G06Q 10/1053 |
| | | | 705/321 |
| 2015/0269529 A1 * | 9/2015 | Kyllonen | G06Q 10/1053 |
| | | | 705/321 |
| 2016/0292639 A1 * | 10/2016 | Kurjanowicz | G06Q 10/105 |

(Continued)

OTHER PUBLICATIONS

Chuan Qin, Hengshu Zhu et al., "Enhancing Person-Job Fit for Talent Recruitment: An Ability-aware Neural Network Approach", Jun. 27, 2018, Computer Science, the 41st International ACM SIGIR Conference on Research & Development in Information Retrieval, DOI:10.1145/3209978.3210025. (Year: 2018).*

(Continued)

*Primary Examiner* — Laura Yesildag
(74) *Attorney, Agent, or Firm* — Foley & Lardner LLP (57) ABSTRACT

Aspects identify target dimensional data value items via machine learning that are most strongly correlated to successful hires for job opportunities within employment data that are similar to a new job opportunity. In response to determining that the target item value for a candidate is deficient to qualify for the new job opportunity, aspects engage the candidate in an automated artificial intelligence chat bot agent interview process that acquires interview audio and image response data from the candidate; extract data relevant to the target item from interview audio and image data; determine an objective value for the target item as a function of the extracted data; and qualify the candidate for suitability for the new job opportunity as a function of resume data mapped to the metadata representation of the candidate and the objective value determined for the target item.

12 Claims, 3 Drawing Sheets

(56) References Cited

U.S. PATENT DOCUMENTS

| | | | | |
|---|---|---|---|---|
| 2017/0308841 | A1* | 10/2017 | Swaminathan | G06N 5/04 |
| 2018/0018633 | A1* | 1/2018 | Khaef | G06F 16/9535 |
| 2018/0089627 | A1* | 3/2018 | Liss | G06F 16/951 |
| 2018/0150739 | A1* | 5/2018 | Wu | G06N 3/006 |
| 2018/0158027 | A1* | 6/2018 | Venigalla | G06F 7/026 |
| 2019/0019160 | A1* | 1/2019 | Champaneria | G06N 5/04 |

OTHER PUBLICATIONS

F. Siraj, N. Mustafa, et al., "Pre-selection of Recruitment Candidates Using Case Based Reasoning," 2011 Third International Conference on Computational Intelligence, Modelling & Simulation, Langkawi, Malaysia, 2011, pp. 84-90, doi: 10.1109/CIMSim.2011.24. (Year: 2011).*

Arya, AI Recruiting Technology, 2019, https://goarya.com/, entire document.

Ideal, AI for Recruiting: A Definitive Guide for HR Professionals, 2019, https://ideal.com/ai-recruiting/, entire document.

LeoForce, AI Recruiting Software Demo, 2019, https://go.leoforce.com/arya-demo-request-ga?utm_source=Google%20Ad&utm_medium=cpc&utm_campaign=2018-ALL-AdWords-Arya&creative=237486269002&keyword=recruit%20ai&matchtype=p&network=g&device=c&gclid=EAlalQobChMI9sC_38jo3gIV05FbCh3FEwJeEAAYAyAAEgJMM_D_BwE, entire document.

Sense, HQ, 2019, https://www.sensehq.com/?utm_source=google&medium=cpc&utm_campaign=Sense%20General%20-%20Recruitment&utm_keyword=%2Bai%20%2Brecruiting&gclid=EAlalQobChMI9sC_38jo3gIV05FbCh3FEwJeEAAYBCAAEgLtmPD_BwE, entire document.

* cited by examiner

MULTI-DIMENSIONAL CANDIDATE CLASSIFIER

BACKGROUND

Human resource management (sometimes "HRM" or "HR") generally refers to functions and systems deployed in organizations that are designed to facilitate or improve employee, member or participant performance in service of an organization or employer's strategic objectives. HR comprehends how people are identified, categorized and managed within organizations via a variety of policies and systems. Human Resource management systems may span different organization departments and units with distinguished activity responsibilities: examples include employee retention, recruitment, training and development, performance appraisal, managing pay and benefits, and observing and defining regulations arising from collective bargaining and governmental laws. Human Resource Information Systems (HRIS) comprehend information technology (IT) systems and processes configured and utilized in the service of HR, and HR data processing systems which integrate and manage information from a variety of different applications and databases.

SUMMARY

In one aspect of the present invention, a method includes a processor identifying a target item from a universe of dimensional data values in response to determining via a machine learning process that the target item is most strongly correlated to successful hires for a plurality of current job opportunities within employment data that are each similar to a new job opportunity; in response to determining that a value of the target item within resume data mapped to a metadata representation of a candidate is deficient to qualify the candidate for the new job opportunity, engaging the candidate via an artificial intelligence chat bot agent in an automated interview process that acquires interview audio and image response data from the candidate via a microphone and a camera in response to queries to the candidate for data relevant to the target item; extracting data relevant to the target item from the interview audio and image data; determining an objective value for the target item as a function of the extracted data; and qualifying the candidate for suitability for the new job opportunity as a function of the resume data mapped to the metadata representation of the candidate and the objective value determined for the target item.

In another aspect, a system has a hardware processor in circuit communication with a computer readable memory and a computer-readable storage medium having program instructions stored thereon. The processor executes the program instructions stored on the computer-readable storage medium via the computer readable memory and thereby identifies a target item from a universe of dimensional data values in response to determining via a machine learning process that the target item is most strongly correlated to successful hires for a plurality of current job opportunities within employment data that are each similar to a new job opportunity; in response to determining that a value of the target item within resume data mapped to a metadata representation of a candidate is deficient to qualify the candidate for the new job opportunity, engages the candidate via an artificial intelligence chat bot agent in an automated interview process that acquires interview audio and image response data from the candidate via a microphone and a camera in response to queries to the candidate for data relevant to the target item; extracts data relevant to the target item from the interview audio and image data; determines an objective value for the target item as a function of the extracted data; and qualifies the candidate for suitability for the new job opportunity as a function of the resume data mapped to the metadata representation of the candidate and the objective value determined for the target item.

In another aspect, a computer program product has a computer-readable storage medium with computer readable program code embodied therewith. The computer readable program code includes instructions for execution, which cause the processor to identify a target item from a universe of dimensional data values in response to determining via a machine learning process that the target item is most strongly correlated to successful hires for a plurality of current job opportunities within employment data that are each similar to a new job opportunity; in response to determining that a value of the target item within resume data mapped to a metadata representation of a candidate is deficient to qualify the candidate for the new job opportunity, engage the candidate via an artificial intelligence chat bot agent in an automated interview process that acquires interview audio and image response data from the candidate via a microphone and a camera in response to queries to the candidate for data relevant to the target item; extract data relevant to the target item from the interview audio and image data; determines an objective value for the target item as a function of the extracted data; and qualify the candidate for suitability for the new job opportunity as a function of the resume data mapped to the metadata representation of the candidate and the objective value determined for the target item.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

DETAILED DESCRIPTION

Conventional HR interview and candidate assessment services or processes are prone to generating unreliable results due to the application of personal bias by interviewers and assessors in assessing candidate attributes, and intentional misrepresentation or obfuscation by candidates of the values of some candidate attributes. For example, one research study concluded that recruiters commonly form an opinion about a candidate within the first ten (10) seconds of a personal interview, wherein this opinion acts as a filter or template during the remainder of the interview, leading to inaccuracies in assessments when facts and values formed by the interviewer are formed or discarded as a function of fitting or otherwise confirming expectations associated with the initially-formed opinion. Employers may attempt to correct the effect of such initial opinions, and for their formation as a function of personal bias on the part of the interviewer, by utilizing third-party recruiting agencies that use training and other mechanisms to prevent the impact of initial opinions and bias on assessments generated by their trained interviewers.

However, even highly-trained recruiters are inherently susceptible to the influence of their personal impressions as to the quality of expression and communication skills of a candidate during an interview, which may result in unreliable assessment results. For example, such initial opinions or personal bias may result in a conclusion that a candidate is an acceptable or preferred fit for a job in response to meeting the interviewer's expectations for interpersonal behavior or is unacceptable in response to failing such expectations, though the objective job qualifications of the candidate are no better or worse than the same values for another candidate.

Further, interpersonal communication cues may be conveyed by an interviewer as to qualities that an interviewer considers important for an available position. In response to recognizing or interpreting such cues, candidates may overtly misrepresent prior education or work experience history, or conduct an interview in a way that obfuscates defects and maximizes positive impressions or interpretations of ambiguous history data. For example, in response to an interviewer stating that showing up early for work and routinely accepting offers for voluntary overtime demonstrate reliability in the mind of the interviewer, a candidate may imply or misrepresent amounts of yearly bonus fees earned at a current employer as indicative of services above and beyond standard working hours, when, in fact, such amounts were set independent of any overtime or work efforts outside of the work day.

Figure 1:
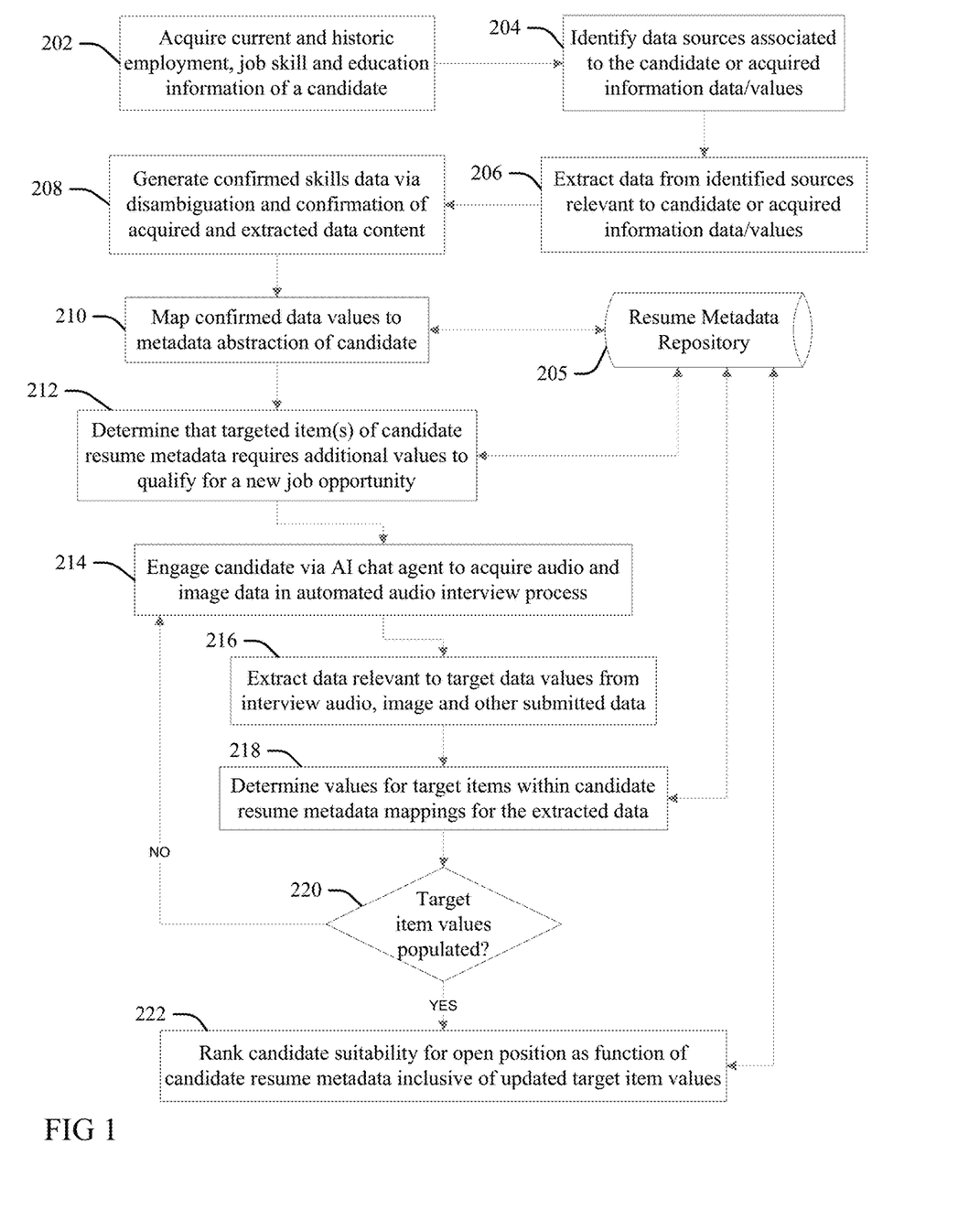
FIG. 1 is a flow chart illustration of a method or process aspect according to an embodiment of the present invention.

Aspects of the present invention provide advantages over conventional interview and candidate assessment services, processes and systems in solving the problems discussed above. FIG. 1 illustrates a multi-dimensional, artificial intelligence (AI) interview and candidate assessment system, services or process according to the present invention. At 202 a processor configured according to the present invention (the "configured processor") acquires current and historic employment, job skills and education information (schools attended, degrees conferred, grade point averages, class rank, etc.) of a candidate (organization employee, prospective employee, intern, student, independent contractor, etc.); for example, in response to a question-and-answer form or template displayed or provided to the candidate.

In some embodiments, the configured processor also acquires extracurricular information data at 202 from activities details encompassing (or descriptive of) skill sets and past experiences that are developed rather than directly associated to positions occupied (for example, professional and social society and club membership and activities descriptors) and skills and education information (schools attended, degrees conferred, grade point averages, class rank, etc.) of a candidate (organization employee, prospective employee, intern, student, independent contractor, etc.). The configured processor may directly acquire the data at 202 in response to a question-and-answer form or template displayed or provided to the candidate, and still other acquisition means and techniques will be apparent to one skilled in the art At 204 the configured processor identifies data sources that are relevant or associated to the candidate or to the current and historic employment, job skills and education information data and values acquired at 202, and at 206 extracts additional data from the identified sources that is relevant or associated to the candidate or to the current and historic employment, job skills and education information data and values acquired at 202. A wide variety of data sources may be identified at 204, and the additional data extracted therefrom at 206, and illustrative but not exhaustive examples include:

(i.) Text content extracted via performing optical character recognition (OCR) processing on printed resume documents, cover letters, candidate application paperwork, extra-curricular organization meeting and membership announcements, and other image information identified at 204 as relevant or associated to the candidate as the data and values acquired at 202.

(ii.) Data extracted from social media services, such as joining professional or extracurricular clubs or organizations or technology user groups, changes to marital status, domicile, residence, nationality, visa status, job, education or employer information extracted from postings by the candidate or social connections to Facebook®, Instagram®, LinkedIn® or other social and professional networking media services linked to the candidate at 204 (FACEBOOK and INSTAGRAM are trademarks of Facebook, Inc. in the United States or other countries; LINKEDIN is a trademark of LinkedIn Corp. in the United States or other countries). For example, the configured processor may perform image analysis at 206 of a picture posted in a social media account of a friend of the candidate identified at 204 wherein the candidate is tagged and thereby determine (via comparison to labelled images, or fitting image data masques, etc.) that the candidate is wearing a graduation robe, which when considered in view of text content associated with the image processed via Natural Language Processing (NLP) techniques ("Big State University graduation, so proud!") results in a determination that the candidate has likely earned additional education credentials, which further triggers a search for the name of the candidate within a publication of Big State University of the date of the metadata of the image or posting that lists the names of graduates and their awarded degrees and honors, which results in a determination that the candidate has earned a Master's of Science degree in Electrical Engineering with Honors from Big State University on said date.

In another example, the configured processor performs image analysis at 206 of a picture posted in a social media account of a friend of the candidate identified at 204 wherein the candidate is tagged and thereby determines (via comparison to labelled images, or fitting image data masques, etc.) that the candidate is a member of an extracurricular software programming club depicted within the image, which when considered in view of text content associated with the image processed via Natural Language Processing (NLP) techniques ("Big State University Hadoop Pros!"), results in a determination that the candidate has (likely) gained advanced Hadoop programing skills via participation in the club, which is confirmed (via increasing a confidence weighting) by verifying that the candidate is listed as a member of the club within club membership rolls.

(iii.) Data extracted from text content of standardized testing services, extracurricular activity or professional association newsfeeds, governmental records, credit report agency records, insurance company records, or other external public and/or private sources determined at 204 as relevant or associated to the candidate as the data and values acquired at 202. For example, test scores of the candidate from Advanced Placement (AP), American College Testing (ACT), Scholastic Assessment Test (SAT), Graduate Record Examinations (GRE), Law School Aptitude test (LSAT), Medical College Admission Test (MCAT), Intelligence Quotient (IQ) or another standardized intelligence or proficiency test may be retrieved from public or private records, including via obtaining consent from the candidate; the weather and climate data for residence, work and travel locations of the candidate; employment-related news and announcements, for example, construction of new headquarters in one location, or closure of offices in another location, projected new hires and job categories, etc.; and new regional tax locations, exemptions, visa programs, etc., within specific geographic regions identified at 204 as relevant or associated to the candidate or to the employment titles and data values of the candidate acquired at 202.

(iv.) Mobile device data: this is data and metadata extracted from the cell phone, tablet or other personal mobile programmable device of the candidate, including operating system and current and historic geolocation data.

At 208 the configured processor executes disambiguation and other data confirmation processes on the acquired and extracted text content data to generate confirmed candidate skills data, generally by selecting (most likely) semantic meanings of the extracted text content from a plurality of possible meanings of word content as a function of context. Disambiguation at 208 may comprehend natural language processing sentence boundary disambiguation (deciding where text string sentences begin and end), syntactic disambiguation, semantic disambiguation, and still others will be apparent to one skilled in the art.

At 210 the configured processor maps or embeds the confirmed skills data values to a metadata abstraction or representation of the candidate stored (embedded) within a Resume Metadata Repository 205. The mapping (embedding) at 210 generally de-normalizes the data information into a plurality of data dimensions that define a meta representation (embedded instantiation) of "resume" values of attributes of the candidate that are likely useful for considerations of the candidate for hiring to fill an employment vacancy with one or more potential employers. Mapping at 210 may transform a data element (salary, date of hire, etc.) that varies by data values, type or format across different employees, or organizations or departments, into a uniform, structured data of a specified or common value, data type or format.

Illustrative but not limiting or exhaustive examples of processes or systems applied at 210 include a Job Title Classifier that outputs a single, common job classification code "SOC (15-1133.00—Software Developers" for inputs of each of a plurality of different employee job titles or defined duties, skills or functions of the employees, including text string content derivative descriptions of "Hadoop engineer" and "Machine learning engineer," etc., thereby resolving different input values to a same, common job title code. Further, an "Employee-type Clusterer" may identify type values for an employee by finding commonalities across job title, duties, task, etc.: for example, a plurality of employees may be labeled (or assigned) an "Accounts receivable Services" type in response to determining that they each have duties that include the receipt and approval of payments from vendors or consumers. Still other examples will be apparent to one skilled in the art.

At 212 the configured processor determines that one or more target items of the resume data mapped (embedded) to the Resume Metadata Repository 205 metadata representation of the candidate is deficient, or requires revision, in order to qualify the candidate for a new job opportunity.

The determination at 212 may include identifying that a targeted item strongly associated to qualifying for the new opportunity has an embedded value that is outside of an expected value range, or is missing, etc. In one example, the configured processor determines that for a new job opportunity of "software architect" a target education degree value for the candidate of at least one Bachelor of Arts or Science from a four-year college is missing, and/or that work experience data lacks an expected minimum time (for example, six months, one year, etc.) of job experience within previous employment history as a target item (computer programmer or as an information system analyst), wherein the candidate is unlikely (has less than a 50% chance) to qualify for or successfully achieve said new job opportunity due to said target item deficiencies.

In some embodiments, the configured processor at 212, via a machine learning process, identifies, determines, filters or otherwise learns a target subset of a universe of resume values within the dimensional data values of the Resume Metadata Repository 205 that are most strongly correlated (clustered) with respect to successful hires for current job opportunities within employment data that are each similar to the new job opportunity, and determines a mismatch or other missing value for the candidate within the repository 205 metadata representation. For example, the configured processor determines at 212 that "Hadoop" programming skills are a target item in response to learning that they are top-trending relative to other programming skills for new hires as software architects across a plurality of different employers, and that values on such skills are missing from the candidate metadata representation values.

The configured processor at 212 may also identify target interpersonal communication speaking characteristics or tendency values that are required or strongly associated to the new job opportunity. For example, the "software architect" job opening may include direct supervision or management of a team of computer programmers, and thus the candidate resume metadata stored within the repository (for example, as populated by assessment in prior interviews) should indicate that the candidate has the requisite target interpersonal communication and management communication skill values in engaging the team members. Illustrative but not exhaustive examples of interpersonal communication speaking characteristics or tendency values include: a minimum level of confidence (as measured by speaking in clear, concise (terse) speaking patterns that do not exceed verbiage thresholds for conveying a single task), an expected level of eye contact (at least 75% of interview time facing the phone camera); determining that speaking posture conveys alert attention to the other person in an interview (alignment of torso and arms and legs square to the camera, with upright, straight back, rather than slouching or turning away from engagement of the other speaker), dresses appropriately for context (an amount of match of candidate attire to attire appropriate for context or employer culture of employment of the new opportunity), has a professional demeanor (keeps personal conversational content that is not directly relevant to a work task below a threshold percentage of a total of time spent communicating to a team member), etc.

In some embodiments, machine learning processes discussed herein comprehend executing multi-agent artificial intelligence (AI) processes comprising parallel executions of a plurality of deep-learning machine learning algorithms (for example, big-data preprocessing and classification, topic modeling, clustering, regression and classification, etc.) in order to cluster and categorize resume and interpersonal communication skill dimensional values associated to the successful candidate placements within current or projected job opportunities, and thereby associated to trending hiring behavior for the job opportunity.

At 214 the configured processor evokes an Artificial Intelligence (AI) chat bot agent to engage the candidate in an automated interview process that acquires audio and image (video, still images, etc.) response data from the candidate via a microphone and camera devices and optionally text or other data inputs, to queries to the candidate for data relevant to the target item(s). For example, at 214 the configured processor uses a chat agent application ("app") on a smart phone of the candidate to engage the candidate in a conversational communication wherein the candidate's responses include speech captured by the smart phone microphone that is linked temporally to still or video image data of the candidate (inclusive of face, upper body and/or complete body image) captured by a camera of the smart phone.

The interview process at 214 emphasizes acquisition of the target data values, wherein at 216 the configured processor extracts data relevant to requisite target data values from the interview audio, image (video or still) and other data submitted (for example, updated resume documents, writing samples, etc.) responsive to AI bot agent queries by the candidate during the interview, including quantitative values. For example, at 216 the configured processor determines the value of the answer in years to a chat bot query of "How many years of Hadoop programming experience do you have?"); and assigns quantitative values to qualitative interpersonal behavior values (for example, demeanor, attention, clarity of diction values to qualities of speech (wordiness or amount of usage of redundant words or phrases, clarity of audio, alignment of face or body to camera, strength of match of facial images to face images labelled with different (happy, sad, angry, etc.) expressions, etc.).

Extraction at 216 includes applying speech-to-text and/or natural language processing (NLP) processes to convert or extract audio data to acquire relevant target values, for example, time in years for Hadoop experience, types of college degrees, etc. Examples of data values extracted at 216 also include new or revised job or educational experience values extracted by text content extracted from image analysis of scanned documents or other document images submitted by the candidate. Extraction may also generate numbers or rates of words uttered by a candidate, as well as of indications of hesitation ("ums," "uhs," and other words or sounds) present within the audio determined, and image data labelled as to body part (facial elements, arm, hand and legs and other body parts) and articles (clothing, coffee cups, other hand-held programmable devices, etc.), and still other extracted data elements and values will be apparent to one skilled in the art.

At 218 the configured processor determines values for the target items within the resume metadata mappings for the candidate from the extracted data (thus, updating, revising, or populating values within the repository 205). For example, the configured processor determines a terseness value by comparing the number of individual words, or rate of speech of individual words, over a response time period to a more terseness thresholds, thereby labeling the candidate's verbal output as terse (in response to not exceeding a terseness threshold), or not-terse (in response to exceeding said terseness threshold). The configured processor may also determine verbal efficiency and confidence metric values at 218: for example, labelling individual extracted words with strengths of relevance to a query triggering the response, and labeling non-word sounds (for example, "ums," "uhs," throat-clearing and other words or sounds present within the audio determined as non-words but likely indications of hesitation, uncertainty or poor-diction outputs, etc.), and thereby populating an "efficiency" target item as "efficient" in response to determining that the percentage of relevant spoken words within the extracted (labeled) audio data meets an efficiency threshold, or as "not-efficient" in response to not meeting said efficiency threshold percentage; and populating a "quality-of-speech" target item with an inverse of the percentage of non-word sounds within the extracted audio data (thus, the lower the percentage of non-word sounds, the higher the quality-of-speech metric).

Further, at 218 the configured processor may also compare extracted image data to labelled facial expressions, postures, types of apparel, etc., in order to determine target demeanor data item values as a function of strength of match: for example, strength of match to labelled images of "attentive" facial expressions, "good body posture," "attentive body language," "appropriate business apparel," and still other image analysis relevant to quality of query responses during the interview will be apparent to one skilled in the art.

At 220 the configured processor determines whether the target item values have been populated, or updates thereto completed and, if not, returns to 214 to continue the chat bot interview and provide additional queries for data extraction at 216 and target item population at 218. Thus, at 220 the configured processor determines whether the candidate provided complete answers to the interview queries, so that a requisite target item is updated: for example, in response to determining that the candidate states in audio data that the candidate has machine learning experience, the configured processor determines that the specific type of machine learning is a target value, wherein the configured processor returns to 214 to use the AI chat bot to respond with a follow-up question in a dynamic, conversational process driven by the bot agent, such as "Can you be more specific about the type of machine learning experience you have?".

In response to determining at 220 that the requisite target item values have been achieved, at 222 the configured processor assesses (rates, qualifies, ranks, etc.) the candidate for suitability for the new job opportunity as a function of the entirety of the candidate resume metadata inclusive of the updated target item values. Thus, for a first job opening that has direct personnel management responsibilities, the "terseness" and "quality-of-speech" metrics are weighted more highly relative to a second job opening that does not have direct personnel management responsibilities, wherein low "terseness" and "quality-of-speech" metric values populated for the candidate at 218 may disqualify, or result in a low rating of the candidate for the first job, but have no negative impact on qualifying or rating values for the second job at 222.

In some embodiments, the assessment at 222 includes a binary assessment of "recommended" or "qualified" as to a given job opening, and wherein the configured processor automatically recommends the candidate as a hire to the employer, or even "hires" the candidate (forwards the resume metadata of the candidate to the appropriate human resources entity for immediate hire into the associated opening), providing a "one-click," combination resume review, assessment and hiring process that provides efficiencies in time and resources over conventional, separate, multi-step candidate assessment and hiring processes.

Embodiments improve resume data for the candidate over conventional processes by identifying target data items from machine learning that are most relevant to qualifying the candidate for a new job, wherein the candidate may be otherwise unaware of the importance of such items, and thus would leave them out under conventional HR resume processes. For example, the candidate may not be aware of the up-trending importance of Hadoop skills for current "software architect" job openings, and thus omit listing relevant Hadoop experience in reporting prior work experience in machine learning applications: absent the determination of Hadoop experience as a target item at 212, and the queries to the candidate that extract this experience from the chat bot responses at 216, and populate the appropriate target item value at 218, the candidate would not qualify for the current job opening under conventional resume submission and job search processes.

Figure 2:
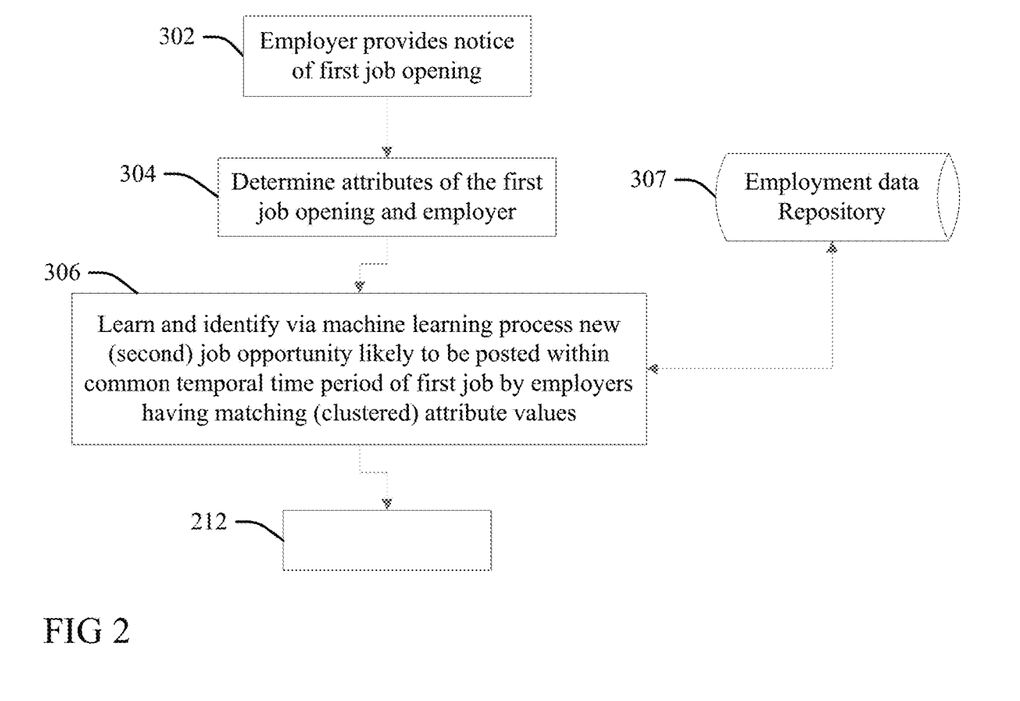
FIG. 2 is a flow chart illustration of another method or process aspect according to an embodiment of the present invention.

FIG. 2 illustrates another embodiment of the present invention that predicts the new job opening or opportunity (considered at 212 of FIG. 1) with a first organization (employer) as a function of another job opportunity published (or otherwise provided) by the same, first employer. In response to notification at 302 (publication, request to employment agency, etc.) of a first job opening with the first employer, at 304 a processor configured according to the present invention (the "configured processor") determines or identifies a (first) plurality of attributes of the first job opening, and a plurality of employer attributes of the first employer. Illustrative but not limiting or exhaustive examples of the determined attributes include job title, requisite employment experience and educational achievements, skills, industry category or type, geographic location of job, temporal context (elapsed time since previous job posting by first employer, and historic average number of job postings at the first employer over a time period inclusive of current and previous postings), general employment trends of the first employer (total numbers of employees, categorized by geographic region, rate of increase or decrease of said total/categorized employees over current and historic time periods, salary rates and comparison of same to competitors), industry type of first employer and similar or competitor employers, and still other relevant and typical attributes will be appreciated by one skilled in the art.

At 306 the configured processor uses a machine learning process to learn and identify, as a function of employment data within a repository 307 (a computer memory storage device, database, cloud memory resource or service, etc.) that a second job opportunity (the new job opportunity of FIG. 1) defined by a plurality of second job attributes is likely to be posted within a common temporal time period (concurrently, or within the next month, quarter, year, etc.) with the first job by employers having matching values of the attributes determined for the first employer (for example, within the same industry, having common or similar numbers of total employee and hiring trends, within a similar geographic region, etc.) Matching determinations at 306 are generally based on clustering processes within the machine learning process.

Thus, as described above with respect to FIG. 1 (and depicted therein), at 212 the configured processor determines that one or more target items of the resume data mapped (embedded) to the Repository 205 metadata representation of the candidate is deficient, or requires revision, in order to qualify the candidate for the identified new job opportunity.

Thus, the embodiments of FIG. 2 identify and recommend new job positions that the employer should fill, or at least advertise for, including recommended salary, in order to acquire additional employees that are most likely to meet the needs of the employer, as indicated by the attributes of the initially-posted, first job opening. Such embodiments are disruptive of conventional hiring practices, which are typically started or driven by the employer. In contrast, the embodiments of FIG. 2 autonomously learn and self-identify likely new positions, and notify prospective employers of the likely necessity that the employers add those positions to their organization, and (via the process of FIG. 1) may further provide recommended candidates, or directly hire recommended candidates, in a combined, "one-click" hiring process: "Here are some new job positions we identified as viable to the future viability of your organization relative to your competitors, and here are the candidates we have pre-selected for you," or " . . . have extended offers of employment for that expire on a [specified date]."

Embodiments provide advantages over conventional job creation, posting, candidate assessment and hiring processes, by preventing the loss of talent from the employer from lack of response to current job trends, pro-actively preventing the loss of talent and keeping good personnel within an organization (by identifying and posting new job opportunities before similar, competing employers post the same job, and autonomously adding new, desirable personnel before the employer realizes the need for such personnel via conventional human resources systems).

Embodiments also provide advantages over conventional HR interview and candidate assessment services or processes via the use of the automated, AI chat bot to acquire or revise key, target data considered for a given job opportunity, which eliminates inaccuracies and inappropriate filtering introduced by the personal bias of human interviewers and assessors in assessing candidate attributes and associated intentional misrepresentation or obfuscation by candidates in response thereto.

Embodiments accelerate the recruitment process by performing job candidate analysis and classification using automated, data-driven techniques, including video screening, facial and emotional recognition, interactive question and answer dialogues driven by natural language processing applied to finding similarities between transcript conversation, job description and resume. Chat bot embodiments include multi-Agent AI structures, ensembles of different machine learning processes that are aligned and trained to address different levels of content comprehension (inclusive of text, video and audio).

Aspects of the present invention progressively learn and improve in proportion to the addition of new employee resume data and employer employment data, increasing the confidence of clustered similarities of data. The more data that is used to train the machine learning processes, from increasing numbers of other relevant employers, the more likely that the learned process will accurately predict and fill new job positions from candidate resume data.

Illustrative but not limiting or exhaustive examples of clustering processes used in machine learning embodiments include "density-based spatial clustering of applications with noise" (DBSCAN), "k-nearest neighbors" (k-NN) and "ordering points to identify the clustering structure" (OPTICS) processes. DBSCAN is a density-based data clustering process wherein given a set of points in some space, DBSCAN groups together points that are closely packed together (points with many nearby neighbors), marking as outliers points that lie alone in low-density regions (whose nearest neighbors are too far away). OPTICS is a process for finding density-based clusters in spatial data that provides advantages over DBSCAN in detecting meaningful clusters in data of varying density, wherein points of a database are (linearly) ordered such that spatially closest points become neighbors in the ordering, and a special distance is stored for each point that represents the density that must be accepted for a cluster so that both points belong to the same cluster. The k-nearest neighbors (k-NN) process is a non-parametric pattern recognition method used for classification and regression: in both cases an input consists of the k-closest training examples in a feature space, wherein the output depends on whether the process is used for classification or regression. Still other clustering processes appropriate for practicing with the present invention will be apparent to one skilled in the art.

Conventional employment opportunity identification and satisfaction (hiring) services fail to offer consistent levels of service, quality or accuracy with respect to projecting employability levels across different technical fields, in part due to inequalities in availability or quality of relevant employment data or business intelligence or across differing career areas. In contrast, via clustering values or recognizing other commonalities in geolocation dimensional data (for example, common geographic region, or within different geographic regions that share demographic similarities (percentages of college graduates with similar degree, or of candidates with similar job descriptions and salary ranges, etc.) within candidate resume metadata embodiments determine confidence of match of a candidate to the skills, salaries, etc., attribute of the considered job openings, wherein the shared dimensional value may bear no direct relation to credentials qualifying a candidate for the new job, and thereby go entirely unconsidered under conventional processes.

Conventional employment opportunity identification and satisfaction (hiring) services are generally costly in proportion to the number of candidates serviced or managed, resulting in larger costs for scaling-up to meet the needs of increased numbers of candidates. In contrast, aspects of the present invention provide advantages over conventional processes. The machine learning aspects of the embodiments described above learn associations of candidate skills data that might seem disparate or otherwise unrelated to other values present within other candidate dimensional data that is determined to be associated to the satisfaction of job opening requirements in a rapid, autonomous fashion that conventional employment opportunity identification and hiring services fail to recognize. By generating multi-class outputs that identify clustered candidate resume data values associated to satisfaction of job opening requirements, aspects may rapidly and autonomously identify target item values to be obtained through AI chat bot interviews, and thereby prioritize suggested or automated dimensional value recommendations and acquisitions (job experiences, educational specific, geographic locations or opportunities, etc.) to focus on the ones that provide the greatest relevance to meeting the job opening requirements.

Moreover, the processes of learning candidate target data items and new job opportunities for retention of same, relative to the remainder others of candidate resume data values, and presenting or selecting only qualified candidates, reduces data considered in an inherent, or overt, filtering process, and embodiments thereby provide computer system data processing and other cost efficiency advantages over conventional employment opportunity identification and hiring services.

Aspects of the present invention include systems, methods and computer program products that implement the examples described above. A computer program product may include a computer-readable hardware storage device medium (or media) having computer-readable program instructions thereon for causing a processor to carry out aspects of the present invention.

Figure 3:
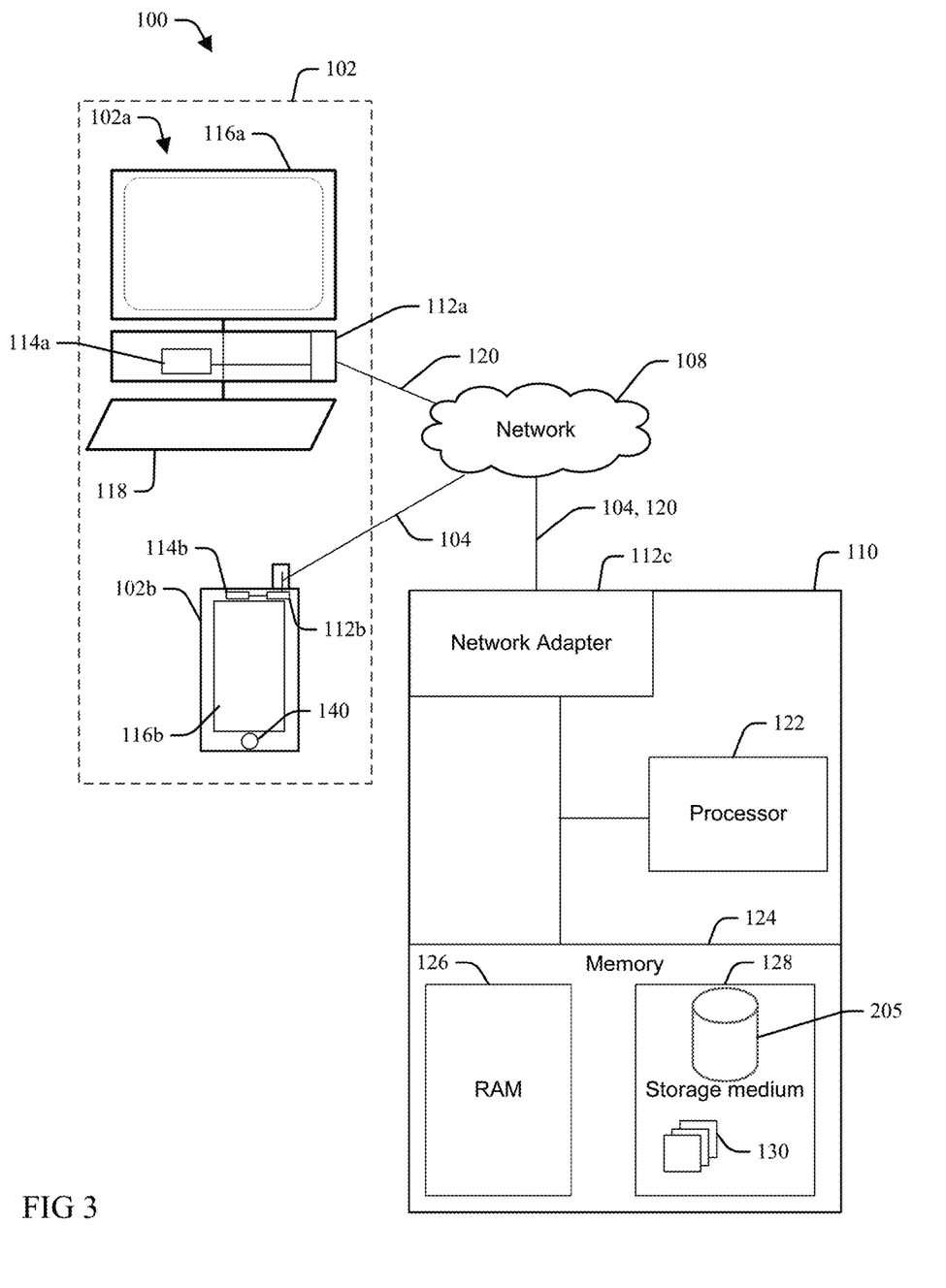
FIG. 3 is a graphic illustration of an example of another implementation according to an embodiment of the present invention.

FIG. 3 is a schematic, graphic illustration of an embodiment of a system 100 for autonomous employment opportunity identification and hiring mechanism pursuant to a process or system of FIGS. 1 and 2. The system 100 includes one or more local computing devices 102, such as, for example, a desktop computer 102a or smartphone 102b, or a laptop computer, personal digital assistant, tablet, cellular telephone, body worn device, or the like. Lines of the schematic illustrate communication paths between the devices 102a, 102b and a computer server 110 over a network 108, and between respective components within each device.

Communication paths between the local computing devices 102a and 102b and the computer server 110 over the network 108 include respective network interface devices 112a, 112b, and 112c within each device, such as a network adapter, network interface card, wireless network adapter, and the like.

In the present example, the smartphone 102b engages the candidate in the AI chat bot interview process described above, transferring (providing) candidate response data 104 (such as input by the candidate through a GUI display device 116b, or spoken into a microphone 140) over a network 108 to a computer server 110 via their respective network interface adapters 112b and 112c. The computer server 110 includes a processor 122 configured (thus, the "configured processor" discussed above with respect to FIGS. 1 and 2) with instructions stored in a memory 124. The processor 122 of the computer server 110 and the processors 114a and 114b of the local computing devices include, for example, a digital processor, an electrical processor, an optical processor, a microprocessor, a single core processor, a multi-core processor, distributed processors, parallel processors, clustered processors, combinations thereof and the like. The memory 124 includes a computer readable memory 126 and a computer readable storage medium 128.

The computer server 110, in response to receiving the candidate data 104, interacts with or updates the employee resume data stored in the resume data repository 205 in the various processes described above with respect to FIG. 1, including exporting generated data 120 over the network 108 to the local computing device 102a via their respective network interface adapters 112c and 112a. The local computing devices 102 include one or more input devices 118, such as a keyboard, mouse, microphone, touch screen, etc., and wherein the processor 114a drive display devices 116a to rank or present the recommended candidate to the employer as described above with respect to FIG. 1 element 222.

The computer readable storage medium 128 can be a tangible device that retains and stores instructions for use by an instruction execution device, such as the processor 122. The computer readable storage medium 128 may be, for example, but is not limited to, an electronic storage device, a magnetic storage device, an optical storage device, an electromagnetic storage device, a semiconductor storage device, or any suitable combination of the foregoing. A computer readable storage medium 128, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be transmitted to respective computing/processing devices from the computer readable storage medium 128 or to an external computer or external storage device via the network 108. The network 108 can include private networks, public networks, wired networks, wireless networks, data networks, cellular networks, local area networks, wide area networks, the Internet, and combinations thereof. The network interface devices 112a, 112b and 122c in each device exchange (receive and send) computer readable program instructions from and through the network 108 and, including for storage in or retrieval from the computer readable storage medium 128.

Computer readable program instructions for carrying out operations of the present invention may include assembler instructions, instruction-set-architecture (ISA) instructions, machine instructions, machine dependent instructions, microcode, firmware instructions, state-setting data, configuration data for integrated circuitry, compiled or interpreted instructions, source code or object code written in any combination of one or more programming languages or programming environments, such as JAVA, Javascript®, C, C#, C++, Python, Cython, F #, PHP, HTML, Ruby, and the like. (JAVASCRIPT is a trademark of Oracle America, Inc., in the United States or other countries.)

The computer readable program instructions may execute entirely on the computer server 110, partly on the computer server 110, as a stand-alone software package, partly on the computer server 110 and partly on the local computing devices 102 or entirely on the local computing devices 102. For example, the local computing devices 102 can include a web browser that executes HTML instructions transmitted from the computer server 110, and the computer server executes JAVA instructions that construct the HTML instructions. In another example, the local computing devices 102 include a smartphone application, which includes computer readable program instructions to perform the processes described above.

The memory 124 can include a variety of computer system readable media. Such media may be any available media that is accessible by computer server 110, and the media includes volatile media, non-volatile media, removable, non-removable media, and combinations thereof. Examples of the volatile media can include random access memory (RAM) and/or cache memory. Examples of non-volatile memory include magnetic disk storage, optical storage, solid state storage, and the like. As will be further depicted and described below, the memory 124 can include at least one program product having a set (e.g., at least one) of program modules 130 that are configured to carry out the functions of embodiments of the invention.

The computer system 100 is operational with numerous other computing system environments or configurations. Examples of well-known computing systems, environments, and/or configurations that may be suitable for use with computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine ("a configured processor"), such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one aspect, a service provider may perform process steps of the invention on a subscription, advertising, and/or fee basis. That is, a service provider could offer to integrate computer-readable program code into the computer system 100 to enable the computer system 100 to perform the processes of FIG. 1 of FIG. 2 as discussed above. The service provider can create, maintain, and support, etc., a computer infrastructure, such as components of the computer system 100, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 110, from a tangible computer-readable medium device 128; (2) adding one or more computing devices to the computer infrastructure 100; and (3) incorporating and/or modifying one or more existing systems 110 of the computer infrastructure 100 to enable the computer infrastructure 100 to perform process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply any precedence, ordering or ranking of any claim elements, limitations or process steps.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
  receiving, by one or more processors coupled with memory, resume data of a candidate;
  embedding, by the one or more processors, the resume data of the candidate into a metadata representation of the candidate within a metadata repository, wherein the metadata repository includes a first plurality of jobs and a first plurality of resume data of candidates successfully hired for the first plurality of jobs;
  receiving, by the one or more processors, a notification of a job opening for a new job opportunity with an employer;
  executing, by the one or more processors, a machine learning process configured to cluster the first plurality of resume data to generate a second plurality of resume data of candidates successfully hired for jobs similar to the new job opportunity based on a comparison of one or more attributes of each job of the first plurality of jobs to one or more attributes of the new job opportunity;
  determining, by the one or more processors using the machine learning process, a target item missing from the metadata representation of the candidate based on a comparison of the metadata representation of the candidate to the second plurality of resume data of candidates successfully hired for jobs similar to the new job opportunity;
  engaging, by the one or more processors, responsive to the determination that the target item is missing from the metadata representation of the candidate, the candidate using an artificial intelligence chat bot agent in an automated interview process comprising:
    transmitting, by the one or more processors to the candidate, a query generated based on the target item;
    receiving, by the one or more processors from the candidate, a response to the query, the response comprising interview audio and image data from the candidate using a microphone and a camera;
    extracting, by the one or more processors, audio data from the interview audio, the audio data including words of the response;
    assigning, by the one or more processors, a label to one or more of the words of the response, wherein the label indicates that the one or more words of the response are a non-word sound; and
    determining, by the one or more processors, a percentage of non-word sounds based on a number of labels assigned to the words of the response;
  determining, by the one or more processors, a value for the target item based on a comparison of the percentage of non-word sounds to a threshold value;
  generating, by the one or more processors, an updated metadata representation of the candidate based on the metadata representation of the candidate and the value for the target item;
  determining, by the one or more processors, that the candidate qualifies for the new job opportunity based on a comparison of the updated metadata representation of the candidate to the second plurality of resume data of candidates successfully hired for jobs similar to the new job opportunity;
  providing, by the one or more processors, to a user interface of a device of the employer, an indication that the candidate qualifies for the job opening responsive to determining the candidate qualifies for the new job opportunity;
  providing, by the one or more processors, to the user interface of the device of the employer, a one-click process for hiring the candidate for the job opening utilizing the metadata representation of the candidate updated to include the value for the target item determined during the automated interview process, responsive to recommending the candidate to the employer;
  executing, by the one or more processors, a hiring process to hire the candidate for the job opening responsive to receiving a selection of the one-click hiring process from the device of the employer; and
  notifying, by the one or more processors, the employer the candidate has filled the job opening, responsive to executing the hiring process to hire the candidate.

2. The method of claim 1, wherein the one or more attributes of each job of the first plurality of jobs and the new job opportunity are selected from the group consisting of job title, requisite employment experience, requisite educational achievements, skills, industry type of the employer, geographic location of job opportunity, temporal context, and employment trends of the industry type of the employer.

3. The method of claim 2, wherein the machine learning process comprises parallel execution of a plurality of multi-agent machine learning processes in order to cluster the first plurality of resume data to generate a second plurality of resume data.

4. The method of claim 3, wherein the plurality of multi-agent machine learning processes comprise a dimensional data reduction selected from the group consisting of principal component analysis, T-distributed stochastic neighbor embedding, density-based spatial clustering of applications with noise and ordering points to identify a clustering structure.

5. The method of claim 2, further comprising:
acquiring, by the one or more processors, resume data from the candidate comprising current and historic employment, job skills and education information;
extracting, by the one or more processors, additional resume data for the candidate from sources identified as relevant to the candidate or to the acquired resume data;
generating, by the one or more processors, confirmed resume data values via disambiguation of the extracted and acquired data; and
embedding, by the one or more processors, the configured resume data values into the metadata representation of the candidate within the repository.

6. The method of claim 5, wherein the extracted additional resume data is selected from the group consisting of:
changes that are extracted from postings linked to the candidate within a social media service that are selected from the group consisting of marital status, domicile, residence, nationality, visa status, job title, education information and employer information;
text content data that is extracted from a newsfeed, a governmental record, a credit report agency record or an insurance company record;
climate data for residence, work and travel locations of the candidate;
news events extracted from a new media source comprising an employment-related new announcement; and
operating system and current and historic geolocation data extracted from a mobile device of the candidate.

7. A system, comprising:
a processor;
a computer readable memory in circuit communication with the processor;
a computer readable storage medium in circuit communication with the processor; and
wherein the processor executes program instructions stored on the computer readable storage medium via the computer readable memory and thereby:
receives resume data of a candidate;
embeds the resume data of the candidate into a metadata representation of the candidate within a metadata repository, wherein the metadata repository includes a first plurality of jobs and a first plurality of resume data of candidates successfully hired for the first plurality of jobs;
receives a notification of a job opening for a new job opportunity with an employer;
executes a machine learning process configured to cluster the first plurality of resume data to generate a second plurality of resume data of candidates successfully hired for jobs similar to the new job opportunity based on a comparison of one or more attributes of each job of the first plurality of jobs to one or more attributes of the new job opportunity;
determines, using the machine learning process, a target item missing from the metadata representation of the candidate based on a comparison of the metadata representation of the candidate to the second plurality of resume data of candidates successfully hired for jobs similar to the new job opportunity;
engages, responsive to the determination that the target item is missing from the metadata representation of the candidate, the candidate using an artificial intelligence chat bot agent in an automated interview process comprising:
transmitting, to the candidate, a query generated based on the target item;
receiving, from the candidate, a response to the query, the response comprising interview audio and image data from the candidate using a microphone and a camera;
extracting audio data from the interview audio, the audio data including words of the response;
assigning a label to one or more of the words of the response, wherein the label indicates that the one or more words of the response are a non-word sound; and
determining a percentage of non-word sounds based on a number of labels assigned to the words of the response;
determines a value for the target item based on a comparison of the percentage of non-word sounds to a threshold value;
generates an updated metadata representation of the candidate based on the metadata representation of the candidate and the value for the target item;
determines that the candidate qualifies for the new job opportunity based on a comparison of the updated metadata representation of the candidate to the second plurality of resume data of candidates successfully hired for jobs similar to the new job opportunity;
provides, to a user interface of a device of the employer, an indication that the candidate qualifies for the job opening responsive to determining the candidate qualifies for the new job opportunity;
provides, to the user interface of the device of the employer a one-click process for hiring the candidate for the job opening utilizing the metadata representation of the candidate updated to include the value for the target item determined during the automated interview process, responsive to recommending the candidate to the employer;
executes a hiring process to hire the candidate for the job opening, responsive to receiving a selection of the one-click process from the device of the employer; and
notifies the employer the candidate has filled the job opening, responsive to executing the hiring process to hire the candidate.

8. The system of claim 7, wherein the one or more attributes of each job of the first plurality of jobs and the new job opportunity are selected from the group consisting of job title, requisite employment experience, requisite educational achievements, skills, industry type of the employer, geographic location of job opportunity, temporal context, and employment trends of the industry type of the employer.

9. The system of claim 8, wherein the machine learning process comprises parallel execution of a plurality of multi-agent machine learning processes in order to cluster the first plurality of resume data to generate a second plurality of resume data; and
wherein the plurality of multi-agent machine learning processes comprise a dimensional data reduction selected from the group consisting of principal component analysis, T-distributed stochastic neighbor embedding, density-based spatial clustering of applications with noise and ordering points to identify a clustering structure.

10. A computer program product, comprising:

a computer readable storage medium having computer readable program code embodied therewith, wherein the computer readable storage medium is not a transitory signal per se, the computer readable program code comprising instructions for execution by a processor that cause the processor to:

receive resume data of a candidate;

embed the resume data of the candidate into a metadata representation of the candidate within a metadata repository, wherein the metadata repository includes a first plurality of jobs and a first plurality of resume data of candidates successfully hired for the first plurality of jobs;

receive a notification of a job opening for a new job opportunity with an employer;

execute a machine learning process configured to cluster the first plurality of resume data to generate a second plurality of resume data of candidates successfully hired for jobs similar to the new job opportunity based on a comparison of one or more attributes of each job of the first plurality of jobs to one or more attributes of the new job opportunity;

determine, using the machine learning process, a target item missing from the metadata representation of the candidate based on a comparison of the metadata representation of the candidate to the second plurality of resume data of candidates successfully hired for jobs similar to the new job opportunity;

engage, responsive to the determination that the target item is missing from the metadata representation of the candidate, the candidate using an artificial intelligence chat bot agent in an automated interview process comprising:

transmitting, to the candidate, a query generated based on the target item;

receiving, from the candidate, a response to the query, the response comprising interview audio and image data from the candidate using a microphone and a camera;

extracting audio data from the interview audio, the audio data including words of the response;

assigning a label to one or more of the words of the response, wherein the label indicates that the one or more words of the response are a non-word sound; and determining a percentage of non-word sounds based on a number of labels assigned to the words of the response;

determine a value for the target item based on a comparison of the percentage of non-word sounds to a threshold value;

generate an updated metadata representation of the candidate based on the metadata representation of the candidate and the value for the target item;

determine that the candidate qualifies for the new job opportunity based on a comparison of the updated metadata representation of the candidate to the second plurality of resume data of candidates successfully hired for jobs similar to the new job opportunity;

provide to a user interface of a device of the employer, an indication that the candidate qualifies for the job opening responsive to determining the candidate qualifies for the new job opportunity:

provide, to the user interface of the device of the employer, a one-click process for hiring the candidate for the job opening utilizing the metadata representation of the candidate updated to include the value for the target item determined during the automated interview process, responsive to recommending the candidate to the employer;

execute a hiring process to hire the candidate for the job opening responsive to receiving a selection of the one-click hiring process from the device of the employer; and notify the employer the candidate has filled the job opening, responsive to executing the hiring process to hire the candidate for the job opening.

11. The computer program product of claim 10, wherein the one or more attributes of each job of the first plurality of jobs and the new job opportunity are selected from the group consisting of job title, requisite employment experience, requisite educational achievements, skills, industry type of the employer, geographic location of job opportunity, temporal context, and employment trends of the industry type of the employer.

12. The computer program product of claim 11, wherein the machine learning process comprises parallel execution of a plurality of multi-agent machine learning processes in order to cluster the first plurality of resume data to generate a second plurality of resume data; and wherein the plurality of multi-agent machine learning processes comprise a dimensional data reduction selected from the group consisting of principal component analysis, T-distributed stochastic neighbor embedding, density-based spatial clustering of applications with noise and ordering points to identify a clustering structure.

* * * * *